(12) United States Patent
Clark

(10) Patent No.: US 6,603,426 B1
(45) Date of Patent: Aug. 5, 2003

(54) SATELLITE INTEGRITY MONITOR AND ALERT

(75) Inventor: Ronald H. Clark, Cupertino, CA (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/813,813

(22) Filed: Mar. 22, 2001

(51) Int. Cl.[7] .............................. H04B 7/185; G01S 5/02
(52) U.S. Cl. ................. 342/357.06; 701/213; 455/12.1; 455/427
(58) Field of Search .................. 342/357.06; 701/213; 455/12.1, 427, 428

(56) References Cited

U.S. PATENT DOCUMENTS

| | | | |
|---|---|---|---|
| 5,046,006 A | * | 9/1991 | Revord et al. |
| 5,490,076 A | | 2/1996 | Rawicz et al. |
| 6,088,571 A | * | 7/2000 | Kane et al. ................. 455/12.1 |
| 6,320,536 B1 | * | 11/2001 | Sasaki ................... 342/357.15 |

OTHER PUBLICATIONS

Robert Wolf, *Onboard Autonomous Integrity Monitoring using Intersatellite Links*, Sep. 19–22, 2000, ION GPS 2000, Salt Lake Sity, UT, pp. 1572–1581.

* cited by examiner

Primary Examiner—Theodore M. Blum
(74) Attorney, Agent, or Firm—Townsend and Townsend and Crew LLP

(57) ABSTRACT

The present invention is a system for providing GPS users with a high level of confidence in the integrity and accuracy of received GPS signals. The system provides a means for each GPS satellite itself to verify the accuracy and/or integrity of its own operations by calculations and processing internal to the GPS satellite and by crosslink communications with other GPS satellites in the GPS constellation. After a GPS satellite verifies the accuracy and/or integrity of its own signals, the GPS satellite transmits an integrity message to all GPS users in view of the satellite. The integrity message can alert GPS users to a loss of integrity or accuracy in the GPS signals. Alternatively, the integrity message can contain information to correct errors in the GPS signals. The integrity message can be incorporated into the existing GPS navigation message transmitted by GPS satellites, or the integrity message can be transmitted over a separate channel such as the planned L5 band channel.

5 Claims, 3 Drawing Sheets

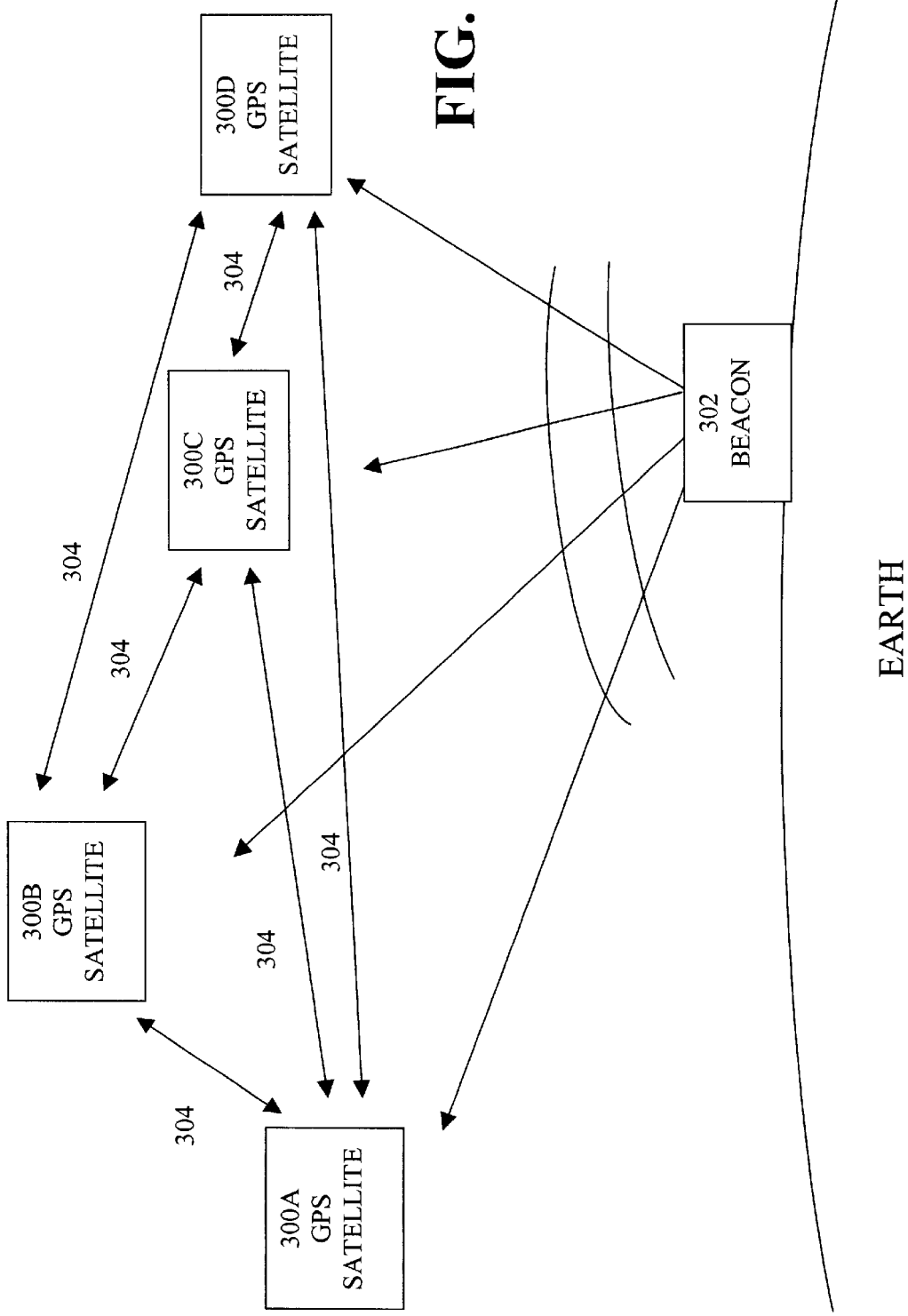

SATELLITE INTEGRITY MONITOR AND ALERT

CROSS REFERENCE TO RELATED APPLICATIONS

This application is related to the following United States Patent Applications all filed on the same day as the present application: Ser. No. 09/813,812 entitled "Satellite Position Monitor"; Ser. No. 09/813,814 entitled "Beacon for Satellite Registration"; Ser. No. 09/813,810 entitled "Satellite Signal Waveform Monitor".

FIELD OF THE INVENTION

The present invention relates to a system and method for monitoring the integrity of a satellite transmission. More specifically, the present invention relates to a system and method for verifying the integrity of Global Position System (GPS) satellite transmissions.

BACKGROUND OF THE INVENTION

The Global Positioning System (GPS) consists of 24 earth-orbiting satellites. The GPS satellites broadcast a navigation message via a radio frequency (RF) signal. This signal allows any individual with a GPS receiver to process the GPS signals and determine his or her precise longitude, latitude, altitude, velocity and time anywhere in the world.

Although Global Positioning System (GPS) provides very accurate position and time information, there are times when GPS satellite system malfunctions can introduce errors into the GPS signal transmitted from the GPS satellite. When this occurs, the GPS receivers will not be able to accurately determine position and/or time. Past data has shown that the GPS signal has typically malfunctioned on the average of around 45 minutes a year. When the GPS satellite system is functioning properly and producing accurate GPS data, the GPS data is described as having "integrity."

GPS errors can be caused by a number of conditions. If one of the GPS satellite transmitter elements or other satellite components fail, the GPS signal waveform can become corrupted. For example, an output amplifier in the GPS satellite may start to malfunction and thereby corrupt the transmitted signal. Another source of error is the failure of the satellite's atomic clock. If a clock failure occurs, the satellite will transmit incorrect time data and introduce error into the computed position information. Another potential error is the transmission of erroneous correction data from GPS ground stations to GPS satellites. GPS ground stations uplink correction data to the GPS satellites every 24 hours. If a ground station sends the wrong correction data, then the GPS satellites will produce inaccurate or erroneous output signals. As an example of this type of error, a ground station could mistakenly send correction data for Tuesday when it was supposed to send correction data for Wednesday.

Errors in GPS signals can lead to severe safety issues or inefficient operation for many systems that use GPS signals such as aircraft systems, transportation systems, weapon systems and so forth. New aircraft navigation systems are being developed which rely on GPS signals for navigation. Errors in the received GPS signal could lead to mid-air crashes. The Federal Aviation Administration (FAA) has a goal of having no more than a $2 \times 10^{-8}$ probability of error in the GPS signal without an alert that the signal is hazardous or misleading. With the current GPS system, the probability of error in the GPS signal is on the order of $10^{-4}$ per satellite per hour or even higher. Thus, the current GPS satellite could produce a probability of error ten thousand times higher than the FAA's desired goal.

Other proposed systems which utilize GPS signals include intelligent highway systems. These intelligent highway systems use GPS signals to manage traffic by providing autonavigation for the automobiles on the freeways. Similar systems have been proposed for trains. Thus, it will be a very important safety issue for these systems to ensure the integrity of the received GPS signals.

Currently, the Global Positioning System (GPS) system does not have any form of integrity monitoring as part of the system. A system known as the "Wide Area Augmentation System" (WAAS) is currently being designed and developed to provide integrity monitoring of GPS. The WAAS will use a series of new ground stations at known locations all over the world. Each ground station will include a satellite antenna which receives GPS signals from the in-view GPS satellites. Each ground station will use these GPS signals to calculate its own position. By comparing the calculated position with the known position of the ground system, the accuracy and the integrity of the GPS signal can be determined.

If the calculated position is different from the known position, a correction message is generated by the ground station. The ground station transmits the correction message to an independent messaging system such as a geosynchronous satellite. This geosynchronous messaging satellite then broadcasts the correction message to all GPS users in the region. The GPS users then use the correction message to correct the GPS data received from the GPS satellites. Alternatively, the geostationary messaging satellite can transmit an integrity message to all GPS users in the region, informing the users of a potential satellite malfunction. GPS users can thereby be informed that they should not rely on the GPS signals being received. Alternatively, the ground system could send the integrity message to a mission control system which sends a message to the GPS satellites to correct the erroneous data or to cease transmitting all GPS navigation data.

This planned WAAS integrity monitoring system will require an enormous cost including the cost of building the new WAAS ground stations, procuring the new geostationary messaging satellites, and the costs of maintaining and operating the ground stations. Estimated costs for the development and implementation of WAAS are greater than 2 billion dollars. Moreover, the WAAS may not be able to signal a problem with GPS integrity with sufficient speed. Systems using GPS frequently need to know of a change in GPS signal integrity in times less than 1 sec after a malfunction or error occurs.

What is needed is a system that can provide a high-level of confidence in GPS integrity without the enormous cost and complexity associated with the WAAS. What is also needed is a system that can correct GPS errors or alert GPS users to a loss of integrity with sufficient speed to satisfy safety concerns and regulatory standards. Lastly, what is needed is a system that can be used either on its own or in conjunction with a WAAS-type monitoring system to provide a high level of confidence in GPS integrity for use in navigation systems, aircraft landing systems, transportation systems, weapon systems, and many other types of systems to provide increased safety and efficiency.

SUMMARY OF THE INVENTION

The present invention is a system for providing GPS users with a high level of confidence in the integrity and accuracy of received GPS signals. The system provides a means for each GPS satellite itself to verify the accuracy and/or integrity of its own operations by calculations and processing internal to the GPS satellite and by crosslink communications with other GPS satellites in the GPS constellation. After a GPS satellite verifies the accuracy and/or integrity of its own signals, the GPS satellite transmits an integrity message to all GPS users in view of the satellite. The integrity message can alert GPS users to a loss of integrity or accuracy in the GPS signals. Alternatively, the integrity message can contain information to correct errors in the GPS signals. The integrity message can be incorporated into the existing GPS navigation message transmitted by GPS satellites, or the integrity message can be transmitted over a separate channel such as the planned L5 band channel.

GPS receivers will receive and decode the integrity messages transmitted by individual GPS satellites. The GPS receivers will then be able to determine whether or not the GPS signals being received have integrity. If the integrity message contains correction data, the GPS receivers can use the correction data to correct the GPS signals. The GPS users will thus be provided with very high confidence in the integrity, accuracy, and reliability of the GPS position and time data. This confidence will enable many new applications to be adopted by the civil community and general public.

Because the system of the present invention allows the GPS satellites themselves to verify their own integrity and/or accuracy, the system eliminates the enormous cost and complexity associated with proposed ground-based GPS integrity monitoring systems like the WAAS. The system of the present invention also provides faster response times and more robust operation than proposed ground based monitoring systems. Additionally, because the GPS satellites themselves report their integrity to GPS users, the need for an independent messaging system is eliminated. As an option, the system could be used in conjunction with a ground-based monitoring system like WAAS, to provide the highest degree of integrity and the lowest probability of GPS error.

The satellite-based GPS monitoring system described herein has three separate component systems:

1. GPS Automated Satellite Signal Waveform Monitor
2. GPS Automated Satellite Position Monitor System
3. GPS Beacon for Auto-registration with Earth Coordinates The Satellite Signal Waveform monitor system allows the GPS satellite to receive its own transmissions and check the integrity of its own transmissions. The Satellite Position Monitor system provides the GPS satellite the capability to send its transmissions to one or more other GPS satellites which then verify the integrity of the transmissions from the originating GPS satellite and send back an integrity message indicating the integrity of the transmissions. The GPS Beacon allows the GPS satellite to verify its operation by receiving a signal from a beacon at a fixed known location. By receiving beacon position data from other GPS satellites, the GPS satellite can compare the beacon position data with satellite position data stored in the GPS satellite. If the data correlates within a certain error, the GPS satellite can determine whether it is operating properly.

Any or all of the above systems and methods can be used to allow GPS satellites to verify their own integrity and/or accuracy of their transmissions. The GPS users will thus be provided with very high confidence in the integrity, accuracy, and reliability of the GPS position and time data. This confidence will enable many new applications to be adopted by the civil community and general public.

BRIEF DESCRIPTION OF THE DRAWINGS

FIG. 3 depicts a block diagram of a GPS beacon for auto-registration with earth coordinates.

DETAILED DESCRIPTION OF THE INVENTION

Figure 1:
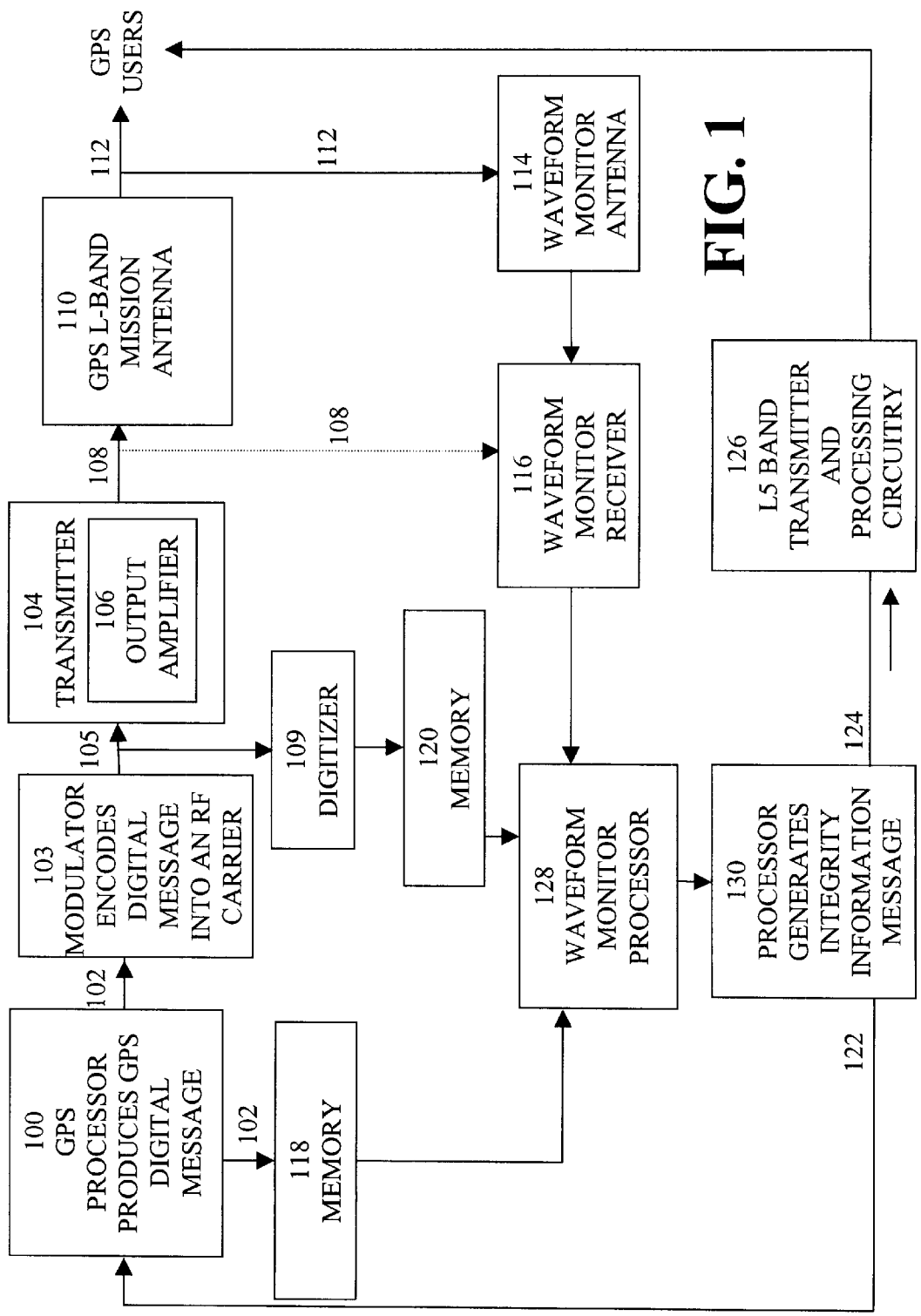
FIG. 1 depicts a block diagram of a GPS automated satellite signal waveform monitor.

The present invention is a system for providing GPS users with a high level of confidence in the integrity and accuracy of received GPS signals. The system provides a means for each GPS satellite itself to verify the accuracy and/or integrity of its own operations by calculations and processing internal to the GPS satellite arid by crosslink communications with other GPS satellites in the GPS constellation. After a GPS satellite verifies the accuracy and/or integrity of its own signals, the GPS satellite transmits an integrity message to all GPS users in view of the satellite. The integrity message can be transmitted directly to the GPS users, or alternatively, the integrity message could be transmitted via one or more relaying satellites or relaying systems.

The term "integrity message" as used herein, refers to a message which indicates the integrity of a transmission (in this case, the GPS navigation message transmission). If the GPS satellite is malfunctioning, and the GPS navigation message transmitted from the GPS satellite is corrupted or erroneous or less accurate than a desired specification level, then the GPS navigation message does not have "integrity." If the GPS navigation message:does not have integrity, then it can not be relied upon for applications that require accurate navigation information.

The integrity message can alert GPS users to a loss of integrity or accuracy in the GPS signals. Alternatively, the integrity message can contain information to correct errors in the GPS signals. The integrity message can be incorporated into the existing GPS navigation message transmitted by GPS satellites, or the integrity message can be transmitted over a separate channel such as the planned L5 band channel.

GPS receivers will receive and decode the integrity messages transmitted by individual GPS satellites. The GPS receivers will then be able to determine whether or not the GPS signals being received have integrity. If the integrity message contains correction data, the GPS receivers can use the correction data to correct the GPS signals. The GPS users will thus be provided with very high confidence in the integrity, accuracy, and reliability of the GPS position and time data. This confidence will enable many new applications to be adopted by the civil community and general public.

Because the system of the present invention allows the GPS satellites themselves to verify their own integrity and/or accuracy, the system eliminates the enormous cost and complexity associated with proposed ground-based GPS integrity monitoring systems like the WAAS. The system of the present invention also provides faster response times and more robust operation than proposed ground based monitoring systems. Additionally, because the GPS satellites themselves report their integrity to GPS users, the need for an independent messaging system is eliminated. As an option, the system could be used in conjunction with a ground-based monitoring system like WAAS, to provide the highest degree of integrity and the lowest probability of GPS error.

The satellite-based GPS monitoring system described herein has three separate component systems which will be each be discussed in detail:

1. GPS Automated Satellite Signal Waveform Monitor
2. GPS Automated Satellite Position Monitor System
3. GPS Beacon for Auto-registration with Earth Coordinates Any or all of the above systems can be used to allow GPS satellites to verify their own integrity and/or accuracy of their transmissions. The GPS users will thus be provided with very high confidence in the integrity, accuracy, and reliability of the GPS position and time data. This confidence will enable many new applications to be adopted by the civil community and general public. Each of these three systems will now be described in detail.

1. GPS Automated Satellite Signal Waveform Monitor

A first system for allowing a GPS satellite to verify the integrity of its GPS signal will be referred to as the "GPS Automated Satellite Signal Waveform Monitor." FIG. 1 depicts a block diagram illustrating the GPS Automated Satellite Signal Waveform Monitor. The waveform monitor allows the GPS satellite to detect its own transmitted waveform. Essentially, the GPS satellite puts an antenna out into its own transmitted signal and receives what it transmits. The GPS satellite then interprets that signal and compares it to what it was supposed to have sent. This waveform monitor will now be described in detail with respect to FIG. 1.

A GPS processor 100 in the GPS satellite produces the digital GPS navigation message 102 which is broadcast to all GPS users in view of the satellite. The digital GPS navigation message 102 contains the information necessary to allow the GPS users to determine their exact location. In the current GPS satellite system, the 1500-bit navigation message is broadcast by each GPS satellite at 50 bps on the L1 and/or L2 bands. This navigation message contains system time, clock correction parameters, ionospheric delay model parameters, and the vehicle's ephemeris and health.

A copy of the digital navigation message 102 is stored in a memory 118. The navigation message 102 is then sent to a modulator 103. Modulator 103 encodes the digital navigation message 102 into an RF carrier signal. Modulator 103 outputs an encoded RF signal 105 to transmitter 104. A digitizer 109 digitizes the RF signal 105 and stores digital data representing the waveform of RF signal 105 in a memory 120.

Transmitter 104 outputs a signal 108 to GPS L-band mission antenna 110. Antenna 110 transmits a radio frequency GPS signal 112 to GPS users in view of the satellite. A waveform monitor antenna 114 is mounted on the GPS satellite in a side lobe of the satellite's L-band mission antenna 110 and is constructed to provide more than 60 dB of signal attenuation. Waveform monitor antenna 114 receives the electromagnetic RF signal 112 being transmitted by GPS transmitting antenna 110. The waveform monitor antenna 114 thus allows the GPS satellite to listen to the very signal that it is transmitting.

The waveform monitor receiver 116 receives the RF signal 112 from waveform monitor antenna 114. A waveform monitor processor 128 receives the RF signal 112 from waveform monitor receiver 116. Waveform monitor processor 128 extracts the digital navigation message encoded in the RF signal 112. Waveform monitor processor 128 performs one or both of the following checks: 1) compares the digital navigation message received from the waveform monitor receiver 116 with the digital navigation message stored in memory 118, and/or 2) correlates the waveform of the RF signal 112 received from the waveform monitor receiver 116 with the waveform data stored in memory 120.

If the GPS system is functioning properly, the received digital navigation message should be the same as the message stored in memory 118, and the received RF waveform should correlate with the waveform data stored in memory 120. In other words, the waveform monitor allows the GPS satellite to listen to the very signal that it is transmitting, and then examine the signal to see if it transmitted what it intended to transmit.

The results of this waveform monitor verification analysis can be used to provide high confidence in the accuracy of the satellite's radiated waveform 112. A processor 130 can generate an integrity message 122 that indicates the accuracy of the transmitted signal. 112 (note that functions performed by processors 100, 128, and 130 illustrated in FIG. 1 could all be performed by one single processor or several different processors). This integrity message 122 could then be included in the digital navigation message 102 prepared by processor 100 which is then transmitted to all GPS receivers in view of the GPS satellite. Alternatively, the satellite could generate a new message 124 and transmit the new message to GPS users over a separate channel such as the L5 channel, a new RF channel which is currently being planned for GPS satellites. L5 band transmitter and processing circuitry 126 would transmit the integrity message 124 to all in-view GPS receivers over the L5-band to provide an instant measure of the integrity of the satellite's transmitted waveform 112 which carries the navigation message.

As an example of waveform monitor operation, if a transmitter element should fail such as transmitter output amplifier 106, the output of transmitter 104 will be distorted. The RF signal 112 transmitted to GPS users will correspondingly be corrupted. The waveform monitor receiver 116 will receive this corrupted RF signal 112. Waveform monitor processor 128 will compare the corrupted RF signal 112 to the RF waveform data stored in memory 120. Waveform monitor processor 114 will also attempt to extract a digital navigation message from corrupted RF signal 112 and compare it to the digital navigation message stored in memory 118. By performing these comparisons, the waveform monitor processor 128 should thereby detect that the transmitted RF signal 112 is corrupted.

The waveform monitor antenna 114, as just described, monitors the RF signal transmitted from GPS L-band mission antenna 110. However, as an alternative, the waveform monitor 116 could monitor the transmitted waveform in other ways. For example, the waveform monitor 116 could tap off the output of transmitter output amplifier 106, and thus monitor the signal 108 coming out of the transmitter output amplifier 106 (this is indicated by the dotted arrow). This signal could then be compared to the data stored in memories 118 and memories 120. It is also possible that the signal could be stored in memory at different locations than the locations shown in FIG. 1. For example, signal 102 between processor 100 and modulator 103 could be stored in memory, and later verified. In this way, the waveform monitor could isolate which portion of the system was producing a distorted waveform, and thereby identify the malfunctioning component. The waveform monitor system just described could also be used on other systems besides GPS satellite systems. The waveform monitor could be used on other types of satellite systems, or more generally space vehicles or any transmitting system to verify the integrity of the transmitted signal.

2. GPS Automated Satellite Position Monitor System

Figure 2:
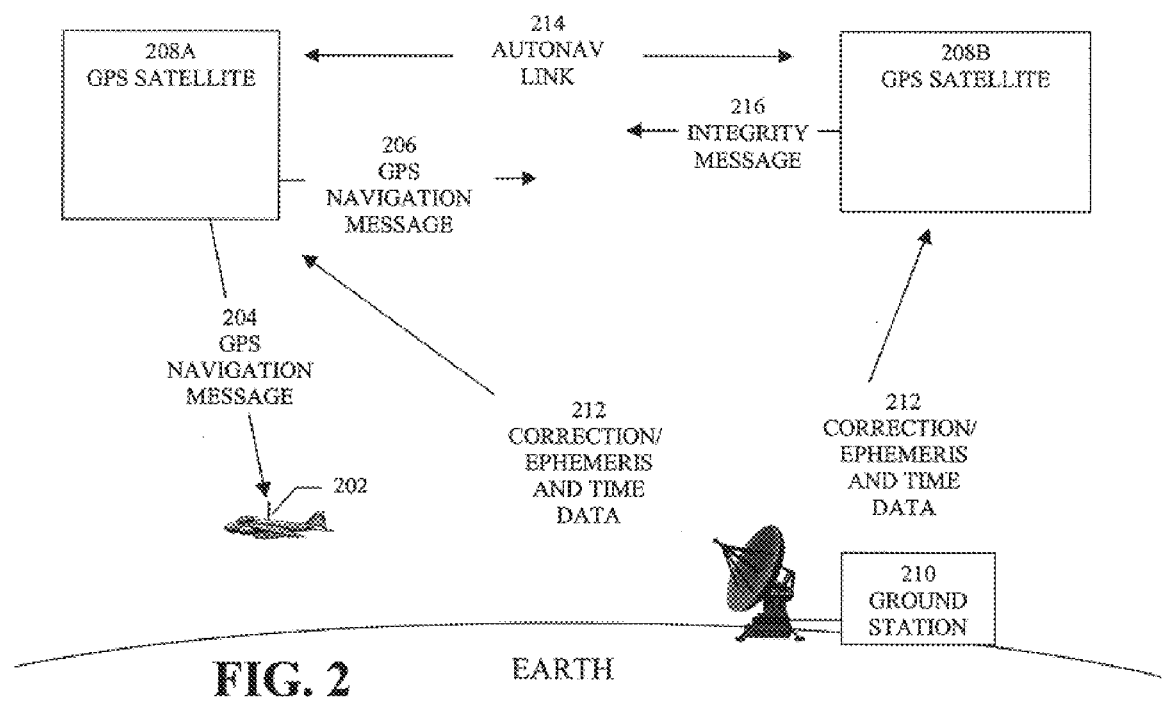
FIG. 2 depicts a block diagram of a GPS automated satellite position monitor system.

FIG. 2 illustrates a second method for monitoring the integrity of the GPS system. This system and method will be referred to as the "GPS Automated Satellite Position Monitor System." As illustrated in FIG. 2, GPS satellite 208A broadcasts the GPS navigation message 204. All GPS users in view of satellite 208A receive the GPS navigation message 204. FIG. 2 depicts an aircraft-borne GPS receiver 202 which is shown receiving GPS navigation message 204.

The automated satellite position monitor system of the present invention sends a duplicate 206 of the GPS navigation message to GPS satellite 208B via an RF or optical crosslink. Satellite 208B is a neighboring GPS satellite located in the same orbital plane of the GPS constellation as Satellite 208A or, alternatively, in an adjacent plane.

Satellite 208B reads the duplicate message 206 sent by GPS satellite. 208A. Satellite 208B then verifies the integrity of duplicate message 206 by comparing the contents of duplicate message 206 with data received from GPS ground stations. The data received from GPS ground stations will now be described in more detail.

All GPS satellites currently receive ephemeris data (a list of accurate positions or locations of the satellite as a function of time), time data, and correction data 212 from a ground station 210 once every twenty four hours. This data is stored in each GPS satellite 208 and used to correct the GPS signal. Based on this data received from the ground, GPS satellite 208A can determine its own position and correct time at any time or its predicted position at a future time. GPS satellite 208A can also determine the position and corrected time and future predicted position of other satellites in the GPS constellation such as GPS satellite 208B.

Satellite 208B determines the position and time of satellite 208A relative to satellite 208B based on the contents of duplicate message 206. Satellite 208B compares this relative position determination of satellite 208A to the position of satellite 208A as determined by data 212 received from GPS ground stations. If the message position determination matches the ground data position determination within a certain error, then the transmission of GPS satellite 208A is determined to have integrity. If there is not a match, the GPS satellite 208A transmission is determined to not have integrity. Thus, a sufficient deviation between the message 206 content and the stored ephemeris data would indicate a satellite 208A-induced error and would be detected by Satellite 208B.

Satellite 208B then sends an integrity message 216 back to Satellite 208A via a crosslink. Integrity message 216 informs satellite 208A whether satellite 208A's transmission has integrity. Satellite 208A can repeat this process with other satellites in the orbital plane to further increase confidence in the accuracy of the navigation message 204. Having verified the accuracy of the position and time data in the navigation message 204, Satellite 208A can transmit an integrity message to all in view GPS receivers. As described previously with respect to the waveform monitor, the integrity message can be sent in two alternative ways. First, the integrity message can be included in the GPS navigation message 204. Alternatively, Satellite 208A could generate a new integrity message and transmit it over the new planned channel, L5. The message would be received and processed by all in-view GPS receivers to provide an instant measure of the accuracy or integrity of the satellite's transmitted position information.

As an alternative to comparing the duplicate GPS navigation message 206 to ground correction/ephemeris data 212, the satellite position monitor system can compare the duplicate message 206 to "Autonav" link 214 data. "Autonav" is a new feature currently being developed for GPS satellites. The Autonav feature allows each GPS satellite to determine its own position relative to the positions of the other in-view GPS satellites based on crosslink transmissions over crosslinks with other GPS satellites. Autonav also allows each satellite to achieve a correct relative time with the other satellites in the constellation. Each GPS satellite crosslinks with four or more other GPS satellites to determine correct position and relative time data.

Using Autonav in lieu of ground station ephemeris data, GPS satellite 208B can store the ephemeris and time data and predicted positions of GPS satellite 208B based on Autonav data. GPS satellite 208B then compares the duplicate message 206 received from GPS satellite 208A with the predicted position and time of satellite 208A based on Autonav data. In this way, the integrity of the position data in GPS navigation message 206 is determined and reported back to satellite 208A via integrity message 216.

With Autonav installed, GPS satellite 208B can determine the position and time of satellite 208A using the following three methods.

1) determine position based on ephemeris and time data received from ground station 210;
2) determine position and time based on GPS navigation message 206; and
3) determine position and time based on Autonav data.

Any or all of these three methods can be compared to each other to verify the integrity of the transmissions from GPS satellite 208A. In this way, the system provides a real time assessment of the accuracy or integrity of the GPS navigation message 204 transmitted from satellite 208A.

3. GPS Beacon for Auto-registration with Earth Coordinates

The "GPS Beacon for Auto-registration with Earth Coordinates" provides a third system and method for verifying the integrity of the GPS system. This system allows the GPS satellite constellation to automatically locate itself with respect to a fixed beacon 302 on the earth. Beacon 302 is located at a fixed point on the earth at a known location (i.e. having known earth coordinates). Beacon 302 emits a coded signal pulse having a precise RF waveform that is received by all GPS satellites 300A–300D in view of this location.

The RF signal pulse emitted by beacon 302 is detected by sensors on the GPS satellites 300. The RF signal pulse is decoded and processed onboard each GPS satellite 300. Each GPS satellite 300 calculates beacon position data such as the distance between the GPS satellite 300 and beacon 302. Each GPS satellite 300 then transmits the beacon position data to the other in-view GPS satellites via intersatellite links 304. The beacon position data allows each GPS satellite 300 to calculate the relative position of beacon 302. This process can be repeated as frequently as is necessary to provide the desired accuracy.

This process of determining the position of beacon 302 by a GPS satellite 300 will be referred to herein as "registration." A single beacon 302 may be sufficient to perform registration. Alternatively, multiple beacons can be used, distributed over the earth surface to provide registration for the entire GPS constellation if needed.

Once a GPS satellite 300 determines its position relative to beacon 302, the GPS satellite 300 can calculate its own coordinates in space, since the earth coordinates of the beacon are known. Once the position of the satellite is calculated, this calculated position can be compared with other satellite position data to verify the integrity of the GPS system. As described previously, each GPS satellite 300 can determine its own position based on 1) ephemeris data received from a ground station, and/or 2) based on an Autonav determination. The position of the GPS satellite 300 from either or both of these sources can be compared to the satellite position determination based on the beacon registration. If the positions match within a certain error, then the GPS satellite can verify its own integrity. If there is a deviation greater than the allowed error, then the GPS satellite can report an integrity malfunction. As described previously, an integrity message can be incorporated in the GPS navigation message or in a separate channel, such as the planned L5 channel.

As an equivalent to the method described above, the GPS satellite can use the satellite position data (such as Autonav) and the beacon position data received from the other GPS satellites to calculate a position of the beacon 302. This calculated position of beacon 302 can be compared with the known position of beacon 302 to determine whether a loss of integrity has occurred.

Because ground measurements and operation are costly and require substantial resources, it is the preferred embodiment that the GPS beacon position determination is compared to an Autonav determination. The GPS beacon registration, when operated in conjunction with Autonav, provides all the data necessary for verification of GPS operation for position information.

Currently, GPS satellites have a system called the Nuclear Detonation (NUDET) Detection System (NDS). NDS consists of NUDET detection sensors on the GPS satellites that are used to detect and locate nuclear explosions on the ground. NDS allows the GPS satellites to identify the location of RF energy that comes from an explosion on the ground. The GPS Beacon can use a similar technique to detect RF beacon 302.

Although the present invention has been described in terms of various embodiments, it is not intended that the invention be limited to these embodiments. Modification within the spirit of the invention will be apparent to those skilled in the art. The scope of the present invention is defined by the claims that follow.

What is claimed is:

1. A method for verifying the integrity of a navigation message transmitted from a Global Positioning System (GPS) satellite, comprising:

monitoring the integrity of a GPS navigation message produced by a first GPS satellite, the monitoring performed by the first GPS satellite or a second GPS satellite; and broadcasting a GPS integrity message from the first GPS satellite to GPS users in-view of the satellite, wherein the GPS integrity message indicates the integrity of the GPS navigation message produced by the first GPS satellite.

2. The method of claim 1, wherein the GPS integrity message is incorporated into the GPS navigation message transmitted to GPS users.

3. A method for verifying the integrity of a signal transmitted from a space vehicle, comprising:

monitoring the integrity of a transmission signal produced by a first space vehicle, the monitoring performed by the first space vehicle or a second space vehicle; and transmitting a first integrity signal from the first space vehicle to a user, wherein the first integrity signal indicates the integrity of the transmission signal produced by the first space vehicle.

4. The method of claim 3, wherein the first and second space vehicles are GPS satellites.

5. The method of claim 3, wherein the first integrity signal is incorporated as a message into the transmission signal.

\* \* \* \* \*